United States Patent
Roh et al.

(10) Patent No.: US 7,450,190 B2
(45) Date of Patent: Nov. 11, 2008

(54) LIQUID-CRYSTAL DISPLAY HAVING A PARTICULAR RATIO OF HORIZONTAL TO VERTICAL FOR EACH PIXEL

(75) Inventors: Nam-Seok Roh, Seongnam (KR); Chong-Chul Chae, Seoul (KR); Kyoung-Ju Shin, Yongin (KR)

(73) Assignee: Samsung Electronics Co., Ltd. (KR)

( * ) Notice: Subject to any disclaimer, the term of this patent is extended or adjusted under 35 U.S.C. 154(b) by 96 days.

(21) Appl. No.: 10/527,556

(22) PCT Filed: Nov. 5, 2002

(86) PCT No.: PCT/KR02/02055

§ 371 (c)(1),
(2), (4) Date: Oct. 16, 2006

(87) PCT Pub. No.: WO2004/027503

PCT Pub. Date: Apr. 1, 2004

(65) Prior Publication Data
US 2007/0040952 A1    Feb. 22, 2007

(30) Foreign Application Priority Data
Sep. 18, 2002  (KR) .................... 10-2002-0056872

(51) Int. Cl.
*G02F 1/136*   (2006.01)
*G02F 1/1343*  (2006.01)
*G02F 1/1337*  (2006.01)

(52) U.S. Cl. .................. 349/43; 349/143; 349/129; 349/130

(58) Field of Classification Search ................. 349/130, 349/43, 158, 129, 143–144
See application file for complete search history.

(56) References Cited

U.S. PATENT DOCUMENTS

| 5,162,933 | A   | * | 11/1992 | Kakuda et al. ................. 349/46 |
| 5,402,141 | A   |   | 3/1995  | Haim et al. |
| 6,100,948 | A   | * | 8/2000  | Kim et al. ..................... 349/39 |
| 6,255,130 | B1  | * | 7/2001  | Kim ............................ 438/30 |
| 6,256,077 | B1  | * | 7/2001  | Baek ........................... 349/43 |
| 6,300,987 | B1  | * | 10/2001 | Jung ............................ 349/39 |
| 6,310,667 | B1  |   | 10/2001 | Nakayoshi et al. |
| 6,545,730 | B1  | * | 4/2003  | Hwang ........................ 349/43 |

(Continued)

FOREIGN PATENT DOCUMENTS

CN           1183570        6/1998

(Continued)

*Primary Examiner*—Mike Qi
(74) *Attorney, Agent, or Firm*—F. Chau & Associates, LLC

(57) ABSTRACT

A liquid crystal display is provided. Red, blue and green pixels are sequentially arranged in a row direction. The red pixels and the green pixels are alternately arranged in a column direction and the blue pixels are arranged in the column direction. Four red and green pixels surrounding adjacent two blue pixels in neighboring two pixel rows face each other. Pixel electrodes and a common electrode have cutouts. A ratio of horizontal to vertical of each pixel is equal to 2:3. In this structure, a PenTile Matrix driving provides high resolution images, and the control of the arrangement of the liquid crystal molecules by the cutouts of the pixel electrode and the common electrode and the common electrode provides wide viewing angle.

11 Claims, 12 Drawing Sheets

U.S. PATENT DOCUMENTS

| | | | |
|---|---|---|---|
| 6,614,492 B1 * | 9/2003 | Song | 349/38 |
| 7,075,601 B2 * | 7/2006 | Hong et al. | 349/109 |
| 2002/0015110 A1 | 2/2002 | Brown Elliott | |
| 2003/0136971 A1 * | 7/2003 | Rhee et al. | 257/98 |
| 2004/0239837 A1 * | 12/2004 | Hong et al. | 349/106 |

FOREIGN PATENT DOCUMENTS

| | | |
|---|---|---|
| CN | 1299984 | 6/2001 |
| JP | 07028065 | 1/1995 |
| JP | 09251160 | 9/1997 |
| JP | 2002-156654 | 5/2002 |
| KR | 1991-0020473 | 12/1991 |
| KR | 1999-0072860 | 9/1999 |
| KR | 1020000048021 | 7/2000 |
| KR | 2003086157 A * | 7/2003 |
| KR | 2003086157 A * | 11/2003 |

* cited by examiner

LIQUID-CRYSTAL DISPLAY HAVING A PARTICULAR RATIO OF HORIZONTAL TO VERTICAL FOR EACH PIXEL

BACKGROUND OF THE INVENTION

1 Field of the Invention

The present invention relates to a liquid crystal display and, more particularly, to a liquid crystal display with a PenTile pixel arrangement for displaying high resolution images.

2 Description of the Related Art

Generally, a liquid crystal display (LCD) includes two panels with electrodes for generating electric fields, and a liquid crystal layer sandwiched between the two panels. Different voltages are applied to the electrodes to form electric fields, which re-orients the liquid crystal molecules in the liquid crystal layer to control the light transmittance, thereby displaying the desired images.

The LCD includes a plurality of pixels with pixel electrodes and red, green and blue color filters. The pixels are driven by signals transmitted thereto via signal wires. The signal wires include scanning signal lines or gate lines for carrying scanning signals, and image signal lines or data lines for carrying image signals. A thin film transistor (TFT) connected to one gate line and one data line are formed at each pixel. The TFT controls the image signals transmitted to the pixel electrode provided in the pixel.

There are several types of arrangements for the red, green and blue color filters at the respective pixels. Among them are a stripe type where the color filters of the same color are arranged along the respective pixel columns, a mosaic type where the red, green and blue color filters are sequentially arranged in row and column directions, and a delta type where the pixels are arranged in zigzags in the column direction, and the red, green and blue color filters are sequentially arranged in the pixels. In the case of the delta type, the three unit pixels with the red, green and blue color filters form one dot, which closely express a circle or a diagonal line on the display screen.

The ClairVoyante Laboratories has proposed a pixel arrangement called the "PenTile Matrix™," which is advantageous in displaying high resolution images while gives minimized design cost. In the pixel arrangement, the blue unit pixel is common to two dots, and the neighboring blue pixels receive the data signals from one data driving IC while being driven by two different gate driving ICs. With the use of the PenTile Matrix pixel arrangements the resolution of the ultra extended graphics array (UXGA) level can be realized by way of a display device of the super video graphics array (SVGA) level. Furthermore, the number of relatively expensive data driving ICs is decreased although the number of relatively cheap gate driving ICs is increased. This minimizes the production cost for the display device.

However, in the above-described LCD, the blue pixel has a shape of a diamond and correspondingly, the signal lines for carrying the data signals are elongated. Consequently, the signal delay of the data signals to be transmitted to the pixels becomes severe such that the display characteristic becomes non-uniform. Therefore, it is difficult to apply the PenTile Matrix pixel arrangement to large LCDs. Furthermore, a blue pixel enclosed by the red and green pixels occupies two pixel columns and the blue pixel differs in size from the red or green pixel, which makes it very difficult to form a storage capacitor required for the LCD.

The data lines for transmitting data signals to the red or green pixels or two gate signal lines become close to each other so that the signal lines is liable to be short-circuited to reduce the production yield and the intervention of the neighboring data lines deteriorates the display characteristic. Furthermore, since the neighboring blue pixels are driven by one driving IC, the data driving ICs are required to be provided at both sides of the display area. Therefore, the display device becomes enlarged and it becomes difficult to form repair lines for repairing disconnection and short circuit at the periphery of the display area. The inversion for preventing the deterioration of the liquid crystal gives irregular polarity to the red, green and blue pixels to generate flicker and to differentiate the brightness of the pixel columns, thereby deteriorating the image quality of the display device.

Meanwhile, in order to increase the resolution, the LCD having a PenTile Matrix pixel arrangement utilizes rendering.

SUMMARY OF THE INVENTION

It is a motivation of the present invention to provide a thin film transistor array panel for a liquid crystal display which involves excellent display characteristic while preventing the signal wire components at the neighboring pixels from being short-circuited.

It is another motivation of the present invention to provide a thin film transistor array panel for a liquid crystal display which involves excellent display characteristic while obtaining the required storage capacitance in a stable manner.

It is still another motivation of the present invention to provide a thin film transistor array panel for a liquid crystal display which involves excellent display characteristic with a minimized panel size while having repair lines for repairing possible disconnection or short-circuiting of the signal wire.

It is still another motivation of the present invention to provide a thin film transistor array panel for a liquid crystal display which can make the inversion in a regular manner.

It is still another motivation of the present invention to provide a thin film transistor array panel for a liquid crystal display which can be well adapted for the rendering driving technique of displaying images at high resolution.

According to one aspect of the present invention, a thin film transistor array panel is provided, which includes: an insulating substrate; a plurality of gate lines carrying scanning signals, formed on the insulating substrate, and proceeding in a transverse direction; a plurality of data lines carrying image signals, proceeding in a longitudinal direction to intersect the gate lines, and insulated from the gate lines; a plurality of pixel electrodes formed in respective pixels defined by intersections of the gate lines and the data lines and receiving the image signals; and a plurality of thin film transistors formed in the pixels and having gate electrodes connected to the gate lines, source electrodes connected to the data lines, and drain electrodes connected to the pixel electrodes, wherein a ratio of horizontal to vertical of each pixel is substantially equal to 2:3.

The pixel electrodes preferably overlap previous gate lines for transmitting the scanning signals to previous adjacent pixel rows to form storage capacitors. Alternatively, the thin film transistor array panel further includes a plurality of storage electrode lines separated from the gate lines, formed of the same layer as the gate lines, and overlapping the pixel electrodes to form storage capacitors. The thin film transistor array panel may further include a protective layer formed between the pixel electrodes and the gate lines and the data lines, made of acryl-based organic insulating material or chemical vapor deposited insulating material having a dielectric constant equal to or less than 4.0, and having a plurality of contact holes for electrically connecting the pixel electrodes to the drain electrodes. The data lines may have a triple-layered structure including an amorphous silicon layer, an ohmic contact layer, and a metallic layer. The pixel electrodes may have cutouts, and a data pad for receiving data signals from an external device may be connected to each data line.

According to another aspect of the present invention, a liquid crystal display is provided, which includes: a first insulating substrate; a plurality of gate lines carrying scanning signals, formed on the first insulating substrate, and proceeding in a transverse direction; a plurality of data lines carrying image signals, proceeding in a longitudinal direction to intersect the gate lines, and insulated from the gate lines; a plurality of pixel electrodes formed in respective pixels defined by intersections of the gate lines and the data lines and receiving the image signals; and a plurality of thin film transistors formed in the pixels and having gate electrodes connected to the gate lines, source electrodes connected to the data lines, and drain electrodes connected to the pixel electrodes; a second insulating substrate facing the first insulating substrate; a black matrix formed on the second insulating substrate; red, green and blue color filters formed on the black matrix and provided at the respective pixels; a common electrode formed on the color filters; and a liquid crystal layer sandwiched between the pixel electrode and the common electrode, wherein red, blue and green pixels are sequentially arranged in a row direction, the red and the green pixels are alternately arranged in a column direction, the blue pixels are repeatedly arranged in the column direction, four red and green pixels surrounding adjacent two blue pixels in neighboring two pixel rows face each other, and a ratio of horizontal to vertical of each pixel is equal to 2:3.

Preferably, each pixel electrode has a first cutout, the common electrode has a plurality of second cutouts, and each pixel is partitioned into a plurality of domains by the first and the second cutouts. Liquid crystal molecules contained in the liquid crystal layer may be aligned perpendicular to the first and the second substrates in absence of electric field between the pixel electrodes and the common electrode.

The liquid crystal display may further include a protective layer formed between the pixel electrodes and the gate lines and the data lines and having a plurality of contact holes for electrically connecting the pixel electrodes to the drain electrodes, the drain electrodes overlapping the second cutouts at least at the contact holes.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or the similar components, wherein.

DETAILED DESCRIPTION OF PREFERRED EMBODIMENTS

Figure 1:
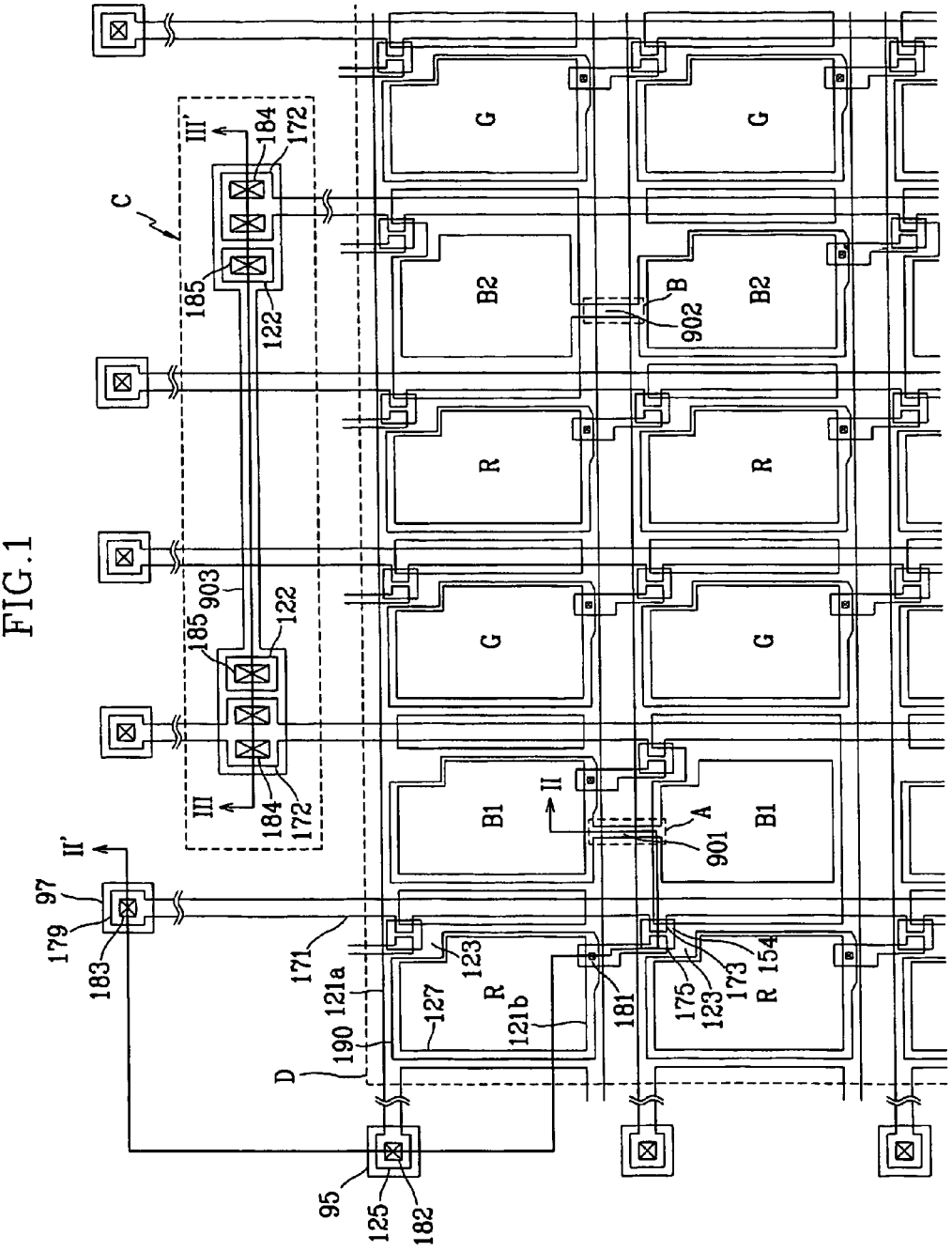
FIG. 1 is a layout view of pixel arrangement of an LCD with a TFT array panel according to a first embodiment of the present invention.

The present invention now will be described more fully hereinafter with reference to the accompanying drawings, in which preferred embodiments of the inventions are shown. The present invention may, however, be embodied in many different forms and should not be construed as limited to the embodiments set forth herein.

In the drawings, the thickness of layers and regions are exaggerated for clarity. Like numerals refer to like elements throughout. It will be understood that when an element such as a layer, film, region, panel or substrate is referred to as being "on" another element, it can be directly on the other element or intervening elements may also be present. In contrast, when an element is referred to as being "directly on" another element, there are no intervening elements present.

Figure 2:
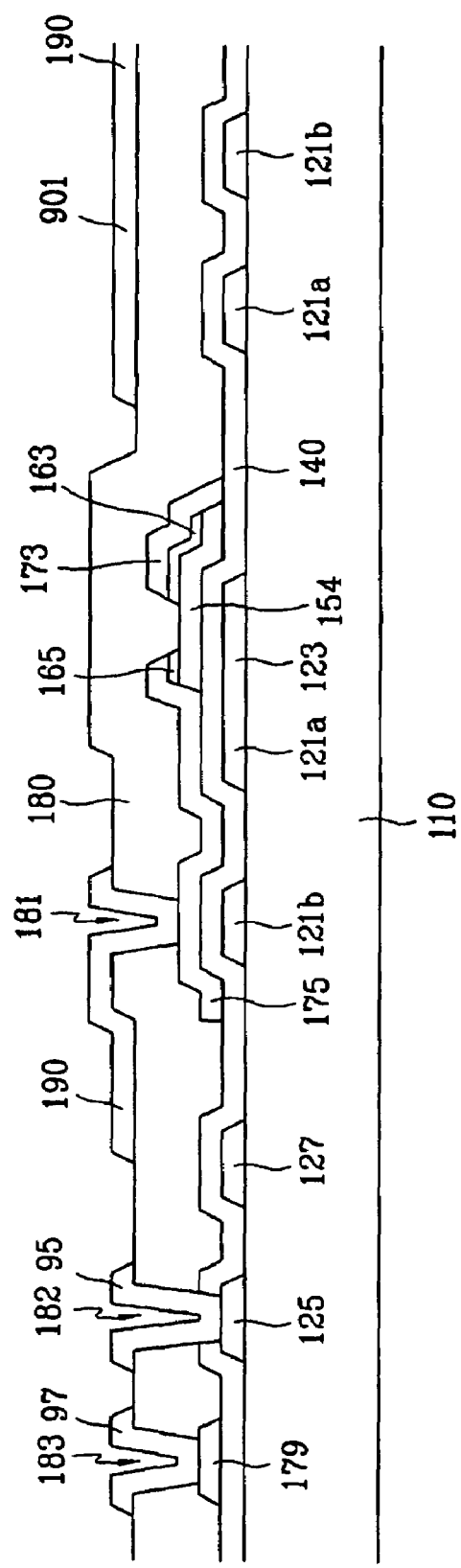
FIGS. 2 and 3 are sectional views of the TFT array panel for the LCD shown in FIG. 1 taken along the lines II-II' and III-III', respectively.
Figure 3:
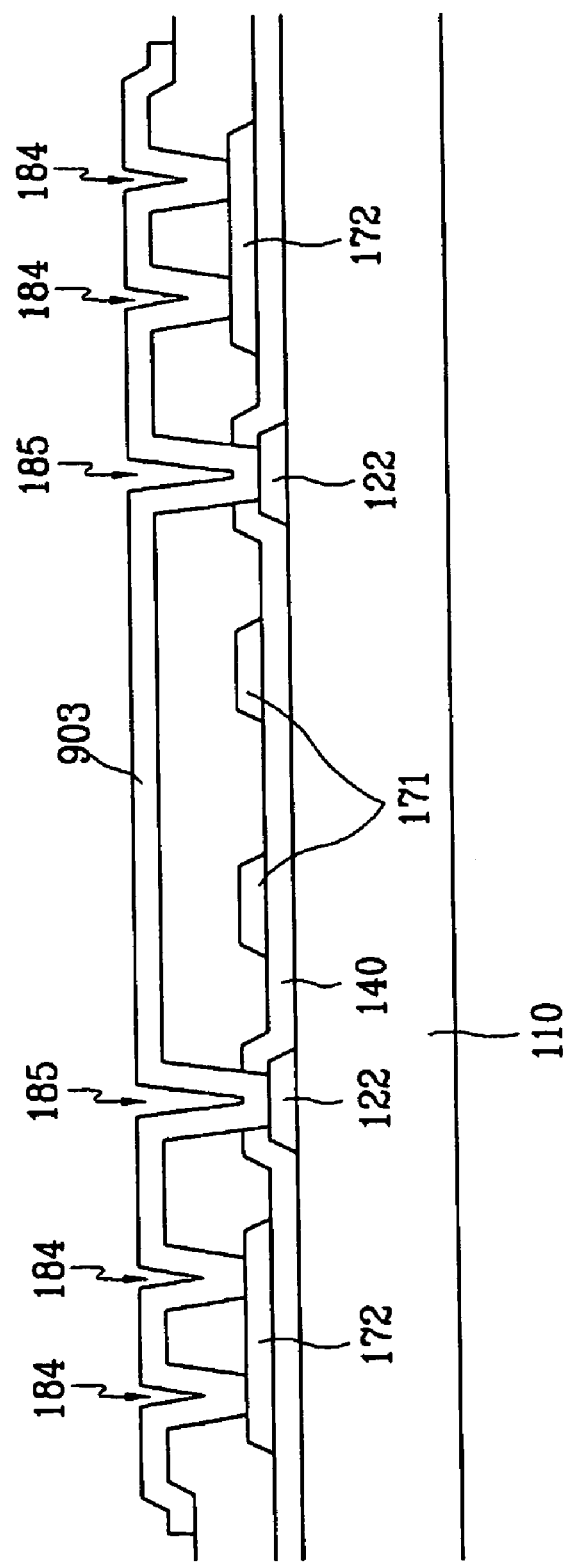

FIG. 1 is a layout view of a pixel arrangement of an LCD according to a first embodiment of the present invention, and FIGS. 2 and 3 are sectional views of the TFT array panel shown in FIG. 1 taken along the line II-II' and the line III-III', respectively. FIG. 2 specifically illustrates a pixel area and a pad area and FIG. 3 specifically illustrates a connection configuration C where the data lines for transmitting data signals to the two blue pixel neighbors B1 and B2 are connected to each other by one pad.

Referring to FIG. 1, an LCD according to a first embodiment of the present invention includes a plurality of red, blue and green pixels R, B1, G, R, B2, and G arranged in a matrix. A pixel row includes sequentially and repeatedly arranged red, blue and green pixels R, B1, G, R, B2 and G and a pixel column includes the pixels representing one of red, green and blue colors. Alternatively, a pixel column includes alternately arranged red and green pixels R and G and the red and the green pixels R and G in a row are such that they are opposite with respect to the blue pixels B1 or B2.

As shown in FIG. 1, a plurality of gate lines (or scanning lines) 121*a* and 121*b* for carrying scanning signals or gate signals, which extend in the row direction, are provided at the respective pixel rows. A plurality of data lines 171 for carrying data signals are provided at the respective pixel columns. The data lines 171 proceed in the column direction such that they cross over the gate lines 121*a* and 121*b* to define pixel areas and are insulated from each other.

A TFT is formed at each cross point of the gate lines 121*a* and the data lines 171. The TFT includes a gate electrode 123 connected to the gate line 121*a*, a source electrode 173 connected to the data line 171, a drain electrode 175 facing the source electrode 173 with respect to the gate electrode 123, and a semiconductor layer 154. A plurality of pixel electrodes 190 are provided at respective pixels and electrically connected to the gate lines 121a and the data lines 171 through the TFTs.

The pixel electrodes 190 for the blue pixels B1 and B2 in two pixel row neighbors are connected to each other by first and second pixel electrode connections 901 and 902, which are alternately arranged in the row direction. One TFT is assigned to two blue pixels B1 or B2 adjacent in the column direction in an alternate manner. For example, the odd pixels in the B1 pixel columns include the TFTs, and the even pixels in the B2 pixel columns include the TFTs. The first and the second connections 901 and 902 overlap the same gate line 121a. Alternatively, the first connections 901 overlap the odd gate lines, while the second connections 902 overlap the even gate lines. In this case, the first and the second connections 901 and 902 may overlap the gate lines for transmitting the scanning signals to the pixels belonging thereto.

Each pixel area has a shape of rectangle having 2:3 horizontal to vertical ratio. The ratio is determined in consideration that two blue pixels form one dot in association with the pair of red and green pixels arranged at the left and the right sides thereof in an alternate manner.

The TFT array panel for the LCD with the above-described pixel arrangement will be specifically described with reference to FIGS. 1 to 3.

Referring to FIGS. 1 to 3, the TFT array panel according to the first embodiment of the present invention includes an insulating substrate 110 and a gate wire formed on the insulating substrate 110 preferably made of metal or conductive material such as Al, Al alloy, Mo, Cr, Ta, Ag, and Ag alloy. The gate wire includes a plurality of scanning signal lines or gate lines 121a and 121b proceeding in a transverse direction in pairs, a plurality of gate electrodes 123 for TFTs being parts of the gate lines 121a, a plurality of connections 127 for interconnecting the respective pairs of gate lines 121a and 121b, and a plurality of gate pads 125 connected to one ends of the gate lines 121a for receiving scanning signals from an external device and transmitting the received signals to the gate lines 121a. The gate wire 121a, 121b, 123, 125 and 127 overlaps pixel electrodes 190 of the neighboring pixel rows to form storage capacitors with storage capacitances enhancing charge storing capacity of the pixels, which will be described later. In case the desired storage capacitance is not obtained, a storage wire formed of the same layer as the gate wire 121a, 121b, 123, 125 and 127 is provided such that it overlaps the pixel electrodes 190.

Meanwhile, a plurality of first pad connections 122 formed of the same layer as the gate wire 121a, 121b, 123, 125 and 127 are provided. The first pad connections 122 are placed in an area C external to a display area D and interconnect the data lines 171 for the neighboring columns of the blue pixels B1 and B2 to one data pad 179. The display area D refers to an area displaying images and including the sets of red, blue and green pixels R, B1, G, R, B2 and G.

The gate wire 121a, 121b, 123, 125 and 127 may have a single-layered structure, a double-layered structure, or a triple-layered structure. In case the gate line wire has a double-layered structure, it is preferable that one layer is made of a low resistance material and the other layer is made of a material having a good contact characteristic with other materials. Examples are Cr/Al (or Al alloy) layers and Al/Mo layers.

A gate insulating layer 140 preferably made of silicon nitride (SiNx) is formed on the gate wire 121a, 121b, 123, 125 and 127 and the pad connections 122.

A semiconductor layer 154 preferably made of hydrogenated amorphous silicon is formed on the gate insulating layer 140, and an ohmic contact layer 163 and 165 preferably made of amorphous silicon heavily doped with n type impurities such as P is formed on the semiconductor layer 154.

A data wire preferably made of a conductive material such as Al, Al alloy, Mo, MoW alloy, Cr, Ta, Cu and Cu alloy is formed on the ohmic contact layer 163 and 165. The data wire includes a plurality of data line units and a plurality of drain electrodes 175. Each data line unit includes a data line 171 proceeding in the longitudinal direction, a plurality of source electrodes 173 of TFTs connected to the data line 171, and a plurality of data pads 179 connected to one ends of the data lines 171 and receiving image signals from an external device. The drain electrodes 175 of TFTs are separated from the data line units 171, 173 and 179 and located opposite the source electrodes 173 with respect to the gate electrodes 123 or TFT portions of the semiconductor layer 154. The data lines 171 for neighboring blue pixel columns B1 and B2 have a plurality of second pad connections 172 protruded from the their ends and having relatively large width. The first pad connections 122 are placed close to the second pad connections 172.

The data wire 171, 173, 175 and 179 and the second pad connections 172 may have a single-layered structure, a double-layered structure, or a triple-layered structure. In case they have a double-layered structure, it is preferable that one layer is made of a low resistance material, and the other layer is made of a material having a good contact characteristic with other materials.

The ohmic contact layer 163 and 165 has a function of lowering the contact resistance between the underlying semiconductor layer 154 and the overlying source and drain electrodes 173 and 175.

A protective layer 180 preferably made of silicon nitride is formed on the data wire 171, 173, 175 and 179 and the semiconductor layer 154. The protective layer 180 has a plurality of contact holes 181 and 183 exposing the drain electrodes 175 and the data pads 179, respectively, and the protection layer 180 and the gate insulating layer 140 have a plurality of contact holes 182 exposing the gate pads. Furthermore, the protective layer 70 has a plurality of contact holes 184 exposing the second pad connections 172, and the protection layer 180 and the gate insulating layer 140 have a plurality of contact holes 185 exposing the first pad connections.

A plurality of pixel electrodes 190 are formed on the protective layer 180. The pixel electrodes 190 receive image signals from the TFTs and generate electric fields together with a common electrode formed on the upper panel. The pixel electrodes 190 are made of a transparent conductive material such as indium tin oxide (ITO) and indium zinc oxide (IZO). The pixel electrodes 190 are physically and electrically connected to the drain electrodes 175 of the TFTs provided at the neighboring pixel rows through the contact holes 181 to receive image signals. The pixel electrodes 190 overlap previous gate wire components 121a, 121b, 123, 125 and 127 for transmitting scanning signals to the TFTs provided at the previously adjacent pixel row to form storage capacitors. In case the desired storage capacitance is not obtained, a storage wire may be formed in a separate manner.

The pixel electrodes 190 for the blue pixels B1 and B2 in the neighboring pixel rows are connected to each other through first and second connections 901 and 902. The pixel electrodes 82 for a pair of blue pixels B1 or B2 connected to each other are connected to a TFT. The TFTs for the blue pixels B1 and B2 in two adjacent pixel rows are alternately provided in the two pixel rows. Therefore, on the area B, the second connection 902 overlaps the previous gate line 121a and 121b. However, on the area B, the first connection 901 interconnecting the pixel electrodes 190 for the blue pixels B1 overlap the gate line 121a for transmitting gate signals to the pixels at the pixel row corresponding thereto.

The overlapping of the first connections 901 and the gate line 121a makes parasitic capacitance causing kick-back voltage, which reduces the pixel voltages applied to the relevant pixel electrodes 190 and generates brightness difference between the neighboring blue pixel columns.

In order to minimize the problem, in the configuration according to the first embodiment of the present invention that the storage capacitance is made by the overlapping of the pixel electrodes 190 and the previous gate wire components 121a, 121b, 123, 125 and 127, the storage capacitance required to be kept uniform. For this purpose, the overlapping area between the first connection 901 and the gate line 121a on the area A is required to be optimized such that the parasitic capacitance due to the overlap thereof be equal to or less than 5% of the sum of the liquid crystal capacitance and the storage capacitance of the relevant pixels. The reason is that if the parasitic capacitance between the first connection 901 and the gate line 121a exceeds 5% of the total capacitance of the liquid crystal capacitance and the storage capacitance of the relevant pixels, the kick-back voltage is increased by equal to or higher than 1V so that the brightness difference between the pixels is serious.

Meanwhile, a plurality of subsidiary gate pads 95 and a plurality of subsidiary data pads 97 formed of the same layer as the pixel electrodes 190 are provided but they are optional. The subsidiary pads 95 and 97 are connected to the gate pads 125 and the data pads 179 through the contact holes 182 and 183 of the protective layer 180 and the gate insulating layer 140, respectively.

A plurality of third pad connections 903 formed of the same layer as the pixel electrodes 190 are provided to electrically interconnect the data lines 171 for transmitting data signals to the neighboring blue pixel columns B1 and B2 to one data pad 179. The two second pad connections 172 connected to the data lines 171 for transmitting data signals to the two neighboring blue pixel columns B1 and B2 as well as the first pad connections 122 positioned close thereto are connected to the third pad connections 903 through the contact holes 184 and 185 exposing them, respectively. The third pad connections 903 cross over the data lines 171 for the neighboring red and green pixels R and G in an insulating manner while electrically interconnecting the two data lines 171 for the neighboring blue pixels to one data pad 179.

Since the data lines 171 for the neighboring blue pixels B1 and B2 are connected to one data pad 179 using the first to the third pad connections 122, 172 and 903, an additional load resistance may be made during the transmission of the data signals due to the contact resistance at the contact holes 184 and 185 and the wire resistance of the first to the third pad connections 122, 172 and 903. It is preferable that the additional load resistance generated by the addition of the connections is equal to or less than 20% of the total load resistance of the data lines 171. The reason is that if the additional load resistance exceeds 20% of the total load resistance of the data lines 171, the charging capacity of the pixels becomes reduced by an amount equal to or larger than 5%, and this deteriorates the display characteristic.

Meanwhile, although the third pad connections 903 for interconnecting the data lines for transmitting the data signals to the two blue pixels B1 and B2 to one pad are formed of the same layer as the pixel electrodes 190 in the structure shown in FIGS. 1 to 3, only the second pad connections may be used for that purpose. The structure of such connections will be now described with reference to FIGS. 4 and 5.

Figure 4:
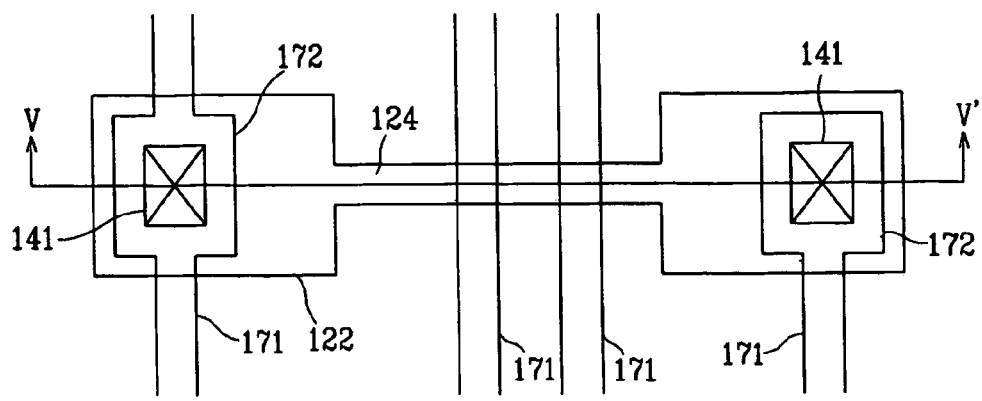
FIG. 4 is a layout view of a connection configuration of a TFT array panel for an LCD according to a second embodiment of the present invention.
Figure 5:
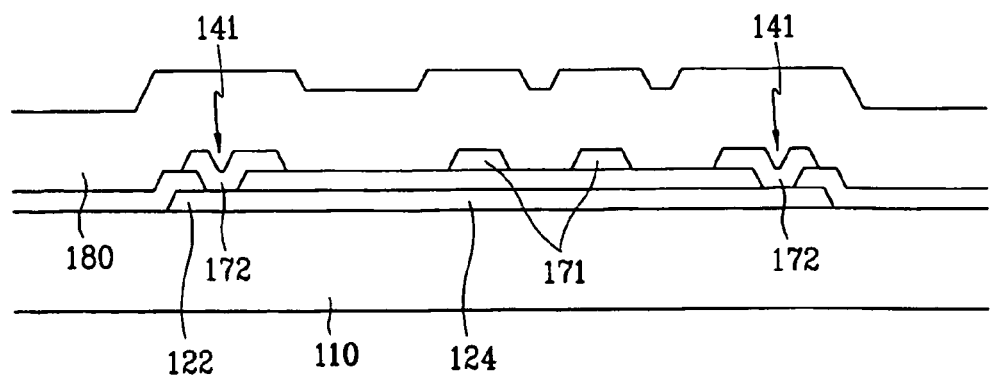
FIG. 5 is a sectional view of the configuration shown in FIG. 4 taken along the line V-V'.

FIG. 4 is a layout view of a configuration for connecting the data lines for transmitting data signals to neighboring two blue pixels B1 and B2 to one pad in a TFT array panel for an LCD according to a second embodiment of the present invention, and FIG. 5 is a sectional view of the configuration shown in FIG. 4 taken along the line V-V'. Most of the structure is the same as those of the first embodiment, and hence, a detailed view thereof is omitted.

As shown in FIGS. 4 and 5, two first pad connections 122 for interconnecting two data lines 171 for neighboring two blue pixels are connected to each other through a connecting member 124. A gate insulating layer 140 has a plurality of contact holes 141 exposing respective first pad connections 122. Two second pad connections 172 connected to the respective data lines 171 for transmitting data signals to the neighboring two blue pixels are connected to the first pad connections 122 through the contact holes 141 such that the two data lines 171 are electrically connected to each other.

Although a TFT array panel for a transmissive LCD including pixel electrodes 190 made of transparent conductive material such as ITO and IZO is exemplified, a reflective conductive material such as Al, Al alloy, Ag and Ag alloy may be used for the pixel electrodes 190.

The above-described configuration according to the embodiment of the present invention, which is similar to the PenTile Matrix pixel arrangement, easily displays a circle and a diagonal such that a letter or a figure can be exactly displayed. Therefore, the resolution of the UXGA degree can be realized by using the pixel arrangement of SVGA and the number of the data pads 179 is decreased. In this way, the number of high cost data driving ICs can be decreased to minimize the cost involved in designing the display device.

Furthermore, since the data lines for transmitting the data signals to the blue pixels have the same shape as the data lines for transmitting the data signals to the red and green pixels, non-uniformity of the display characteristic is prevented. The desired storage capacitance is obtained by the overlapping of the previous gate lines and the pixel electrodes, and simultaneously, the parasitic capacitance due to the overlapping of the connections and the gate lines corresponding thereto is optimized so that the storage capacitance can be formed in a uniform manner. In addition, the data lines for transmitting data signals to the red or green pixels are spaced apart from each other with interposing the unit pixels so that the possible short circuit between the neighboring data lines can be prevented. Furthermore, since the neighboring blue pixels are driven by one driving IC, the display device can have an optimized size and repair lines for repairing the disconnections or short-circuiting of the signal wire can be easily formed at the periphery of the display area.

Although the first embodiment of the present invention forms storage capacitance by overlapping the pixel electrodes with the gate lines, a separate storage wire may be introduced for that purpose.

A method of driving the above-described LCD will be now described in detail.

The LCD may be driven such that the image signals transmitted to the pixel electrodes are required to be repeatedly alternated from positive to negative and vice versa with respect to the common voltage for preventing the liquid crystal from being deteriorated, and the driving technique is called the "inversion." When the polarity inversion of the pixels is non-uniform, the image signals transmitted to the pixel electrodes are seriously distorted to generate flicker, thereby deteriorating the image quality of the LCD. In order to solve the problem, in a PenTile Matrix pixel arrangement including red, blue and green pixel columns arranged in sequence, the data lines for nearest blue pixel columns or next nearest blue pixel columns are connected to one pad, and the data lines for the neighboring red and green pixel columns cross each other to transmit the image signals. This configuration will be now described with reference to the accompanying drawings.

Figure 6:
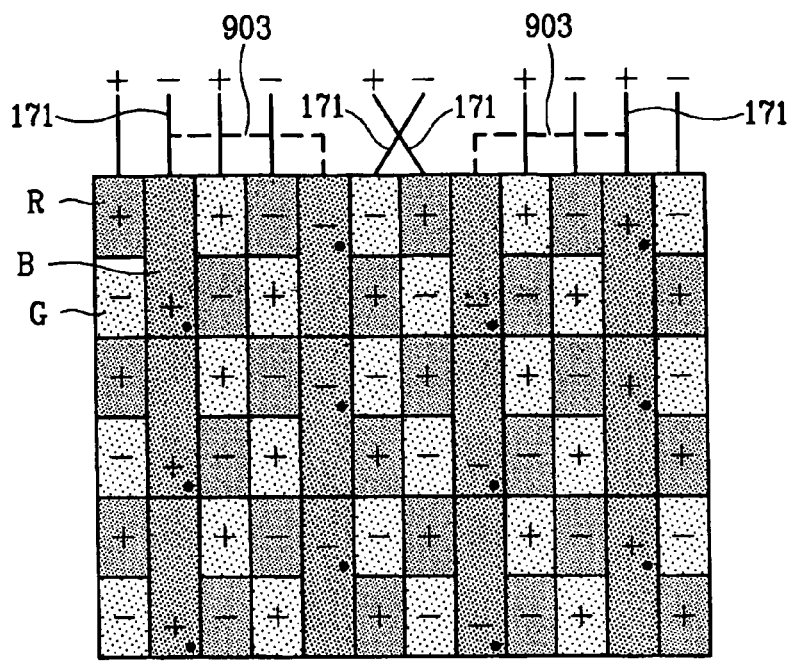
FIGS. 6 to 8 illustrate inversion schemes and connections of signal lines therefor of an LCD according to third to fifth embodiments of the present invention.
Figure 7:
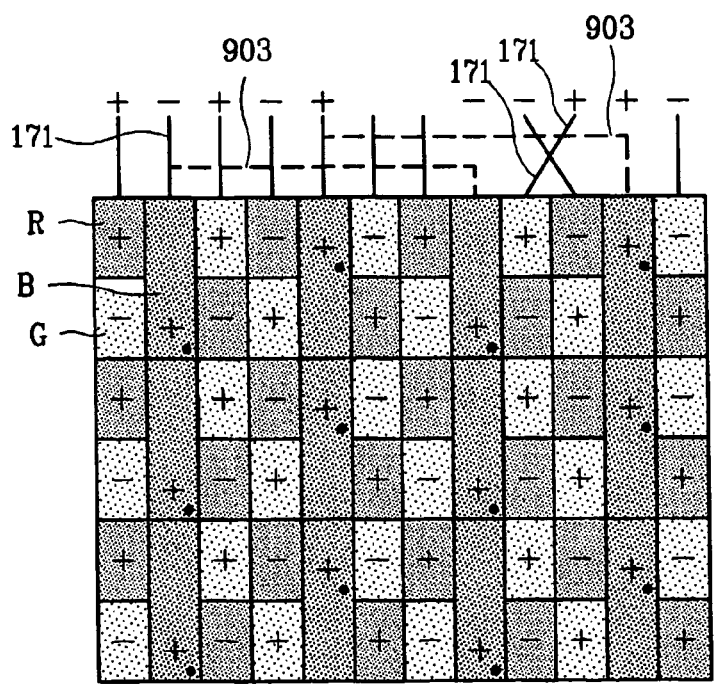
Figure 8:
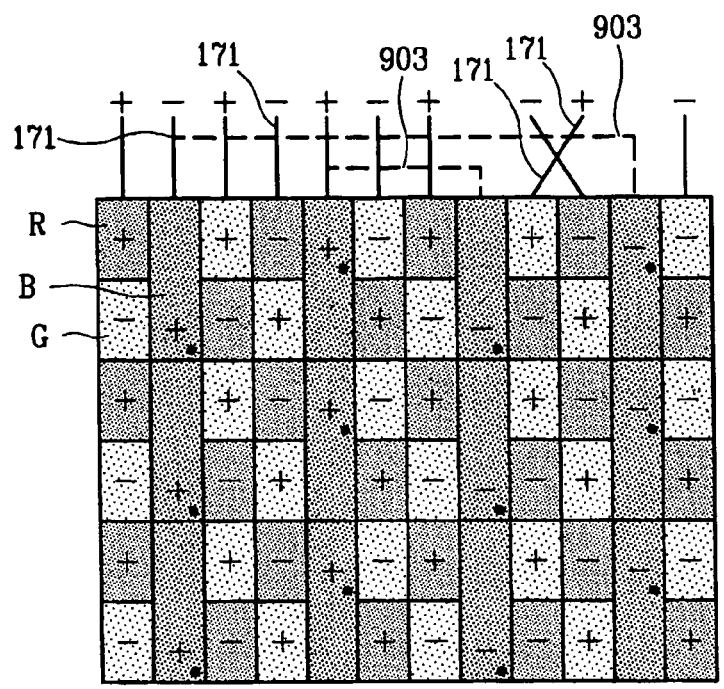

FIGS. 6 to 8 illustrate inversion schemes and connections of signal lines therefor of an LCD according to third to fifth embodiments of the present invention. In the figures, the symbol "•" indicates the position of TFTs of blue pixels arranged along a column direction, and the symbols "+" and "−" indicate the polarities of the pixel voltages (or image signals) applied to pixel electrodes with respect to a common voltage of a common electrode.

As shown in FIGS. 6 to 8, with the LCDs according to the third to the fifth embodiments of the present invention, red, green and blue pixels R, G and B are sequentially arranged in the row direction, and the red and green pixels R and G are alternately arranged in the column direction. The blue pixels B are disposed between the neighboring red and green pixel columns R and G and arranged every two pixel rows. The four red and green pixels surrounding a blue pixel B are disposed opposite each other with respect to the blue pixel B.

In an LCD according to the third embodiment of the present invention shown in FIG. 6, an (n+4)-th data line 171 for blue pixels is electrically connected to an (n+1)-th data line 171 for blue pixels such that an (n+4)-th, blue pixel column receives image signals through a data pad connected to the (n+1)-th data line 171. An (n+7)-th data line 171 for blue pixels is electrically connected to an (n+10)-th data line 171 for blue pixels such that an (n+7)-th, blue pixel column receives image signals through a data pad connected to the (n+10)-th data line 171. Furthermore, an (n+5)-th data line 171 for green pixels crosses the (n+6)-th data line 171 for red pixels such that they transmit image signals to an (n+6)-th, green pixel column and an (n+5)-th, red pixel column, respectively.

When the LCD having the above connection configuration is subject to dot inversion in the column and row directions, it shows a regularity of •••, +++, −−−, +−+, −+−, ••• in the row direction over the entire area of the liquid crystal panel assembly as shown in FIG. 6.

In an LCD according to the third embodiment of the present invention shown in FIG. 7, an (n+7)-th data line 171 for blue pixels is electrically connected to an (n+1)-th data line 171 for blue pixels such that an (n+7)-th, blue pixel column receives image signals through a data pad connected to the (n+1)-th data line 171. An (n+10)-th data line 171 for blue pixels is electrically connected to an (n+4)-th data line 171 for blue pixels such that an (n+10)-th, blue pixel column receives image signals through a data pad connected to the (n+4)-th data line 171. Furthermore, an (n+8)-th data line 171 for green pixels crosses the (n+9)-th data line 171 for red pixels such that they transmit image signals to an (n+9)-th, green pixel column and an (n+8)-th, red pixel column, respectively.

When the LCD having the above connection configuration is subject to dot inversion in the column and row directions, it shows a regularity of •••, +++, −+−, ••• in the row direction over the entire area of the liquid crystal panel assembly as shown in FIG. 7.

In an LCD according to the third embodiment of the present invention shown in FIG. 8, an (n+10)-th data line 171 for blue pixels is electrically connected to an (n+1)-th data line 171 for blue pixels such that an (n+10)-th, blue pixel column receives image signals through a data pad connected to the (n+1)-th data line 171. An (n+7)-th data line 171 for blue pixels is electrically connected to an (n+4)-th data line 171 for blue pixels such that an (n+7)-th, blue pixel column receives image signals through a data pad connected to the (n+4)-th data line 171. Furthermore, an (n+8)-th data line 171 for green pixels crosses the (n+9)-th data line 171 for red pixels such that they transmit image signals to an (n+9)-th, green pixel column and an (n+8)-th, red pixel column, respectively.

When the LCD having the above connection configuration is subject to dot inversion in the column and row directions, it shows a regularity of •••, +++, −+−, +−+, −−−, ••• in the row direction over the entire area of the liquid crystal panel assembly as shown in FIG. 8.

The dot inversion of an LCD according to the fourth embodiment of the present invention makes the regularity of •••, +++, −+−, ••• in the row direction, but makes a frame inversion for the blue pixels along the row direction to generate flicker. In order to solve the problem, column inversion or double-dot inversion is applied FIGS. 9 and 10 illustrate column inversion and double-dot inversion for the LCD according to the fourth embodiment of the present invention.

Figure 9:
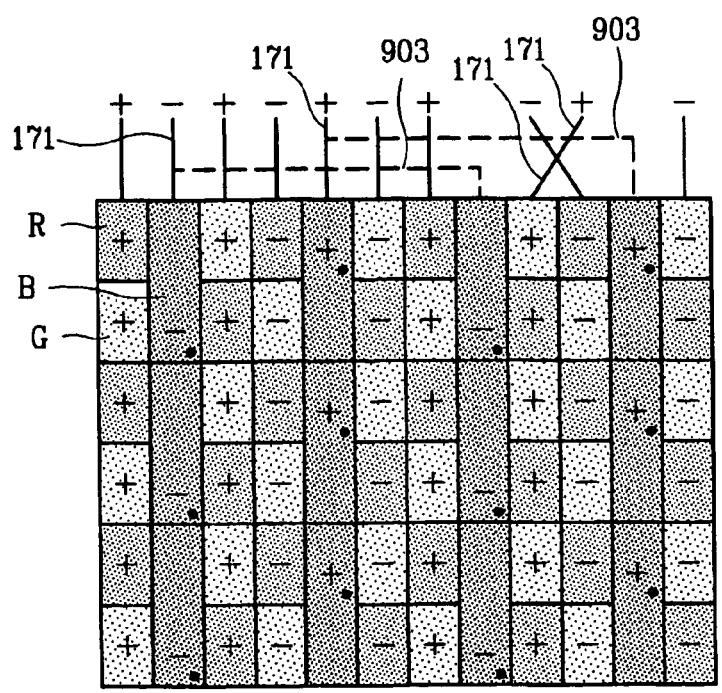
FIGS. 9 and 10 illustrate column inversion and double-dot inversion for the LCD according to the fourth embodiment of the present invention, respectively.

As shown in FIG. 9, the column inversion for the LCD according to the fourth embodiment of the present invention causes a dot inversion for the blue pixels in the row direction, thereby improving the display characteristic.

Figure 10:
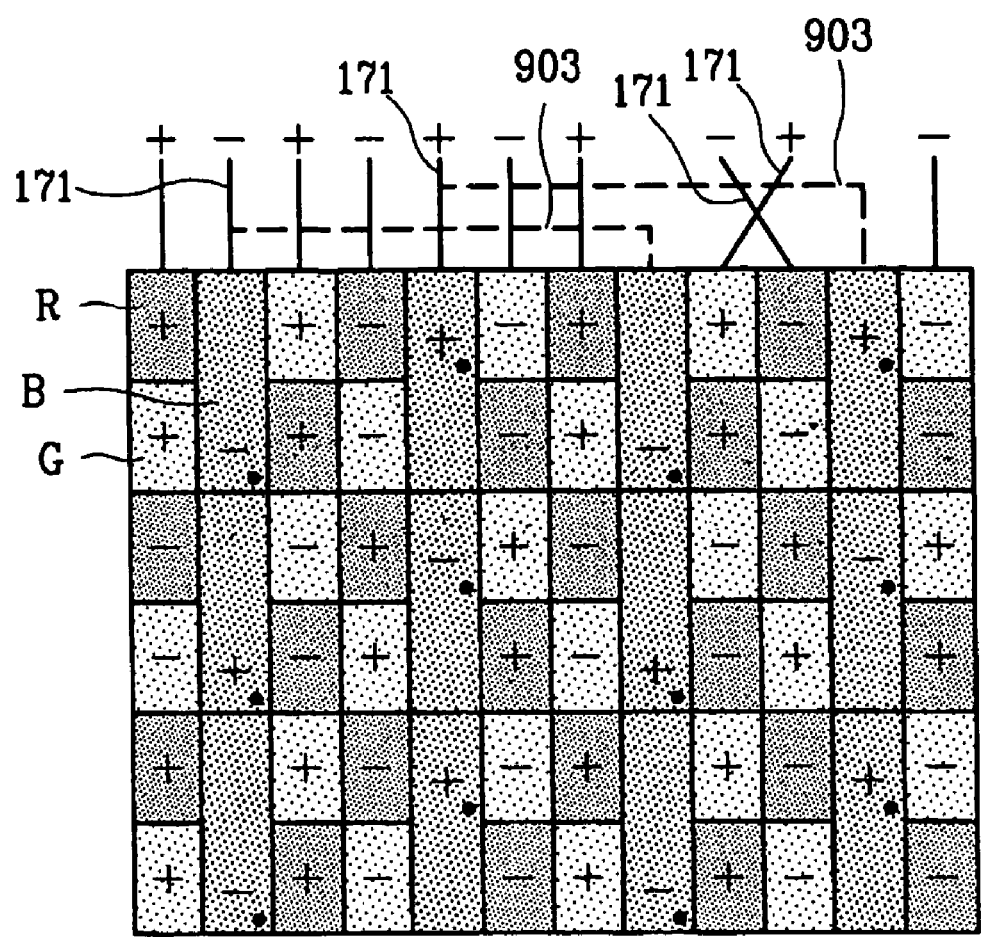

As shown in FIG. 10, a double-dot inversion causes the blue pixels to show a dot inversion both in the column direction and in the row direction.

Meanwhile, when the data lines 171 cross each other to cross-transmit the image signals to the neighboring red and green pixel columns in the LCDs according to the third to the fifth embodiments of the present invention, it is preferable that a data line crossing member is formed of the same layer as the data wire (in relation to the first and the second embodiments of the present invention), the gate wire (in relation to the first and the second embodiments of the present invention), and the pixel electrode (in relation to the first and the second embodiments of the present invention). This will be described with reference to FIGS. 11 and 12.

Figure 11:
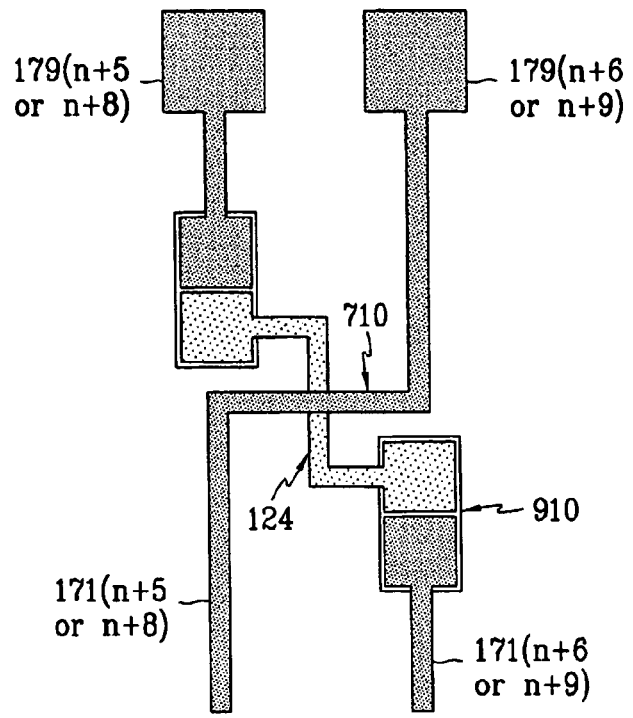
FIGS. 11 and 12 are layout views of a cross-connection of data lines for an LCD according to the third to the fifth embodiments of the present invention.
Figure 12:
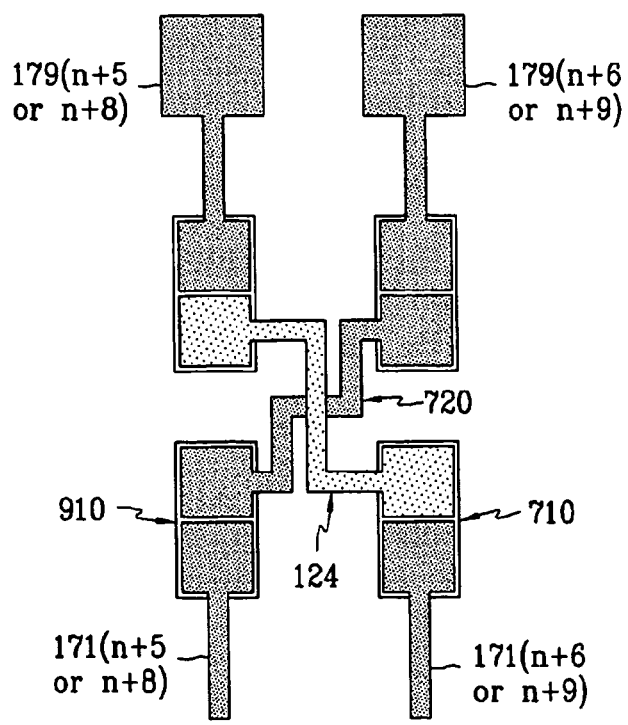

FIGS. 11 and 12 are layout views of a cross-connection of data lines for an LCD according to the third to the fifth embodiments of the present invention. Reference numeral 124 indicates a first crossing member formed of the same layer as a gate wire, reference numeral 710 indicate a second crossing member formed of the same layer as a data wire, and reference numeral 720 indicates a third crossing member formed of the same layer as the pixel electrode.

As shown in FIG. 11, an (n+5)-th data line and an (n+6)-th data line, or an (n+8)-th data line and an (n+9)-th data line for transmitting image signals to the red and the green pixel columns are formed on a TFT array panel for the LCD according to the third to the fifth embodiments of the present invention. The data lines 171 proceed parallel to each other. Data pads 179 are cross-connected to the data lines 171 in a crossed manner. The second crossing member 710 is bent such that it electrically connects the (n+5)-th data line and the (n+8)-th data line to a (n+6)-th data pad and a (n+9)-th data pad, respectively. The first and the third crossing members 124 and 720 connect the (n+6)-th data line and the (n+9)-th data line to a (n+5)-th pad and a (n+8)-th data pad, respectively. The first crossing member 124 is formed of the same layer as the gate wire and curved such that it crosses the second crossing member 710. The third crossing member 720 electrically connects the first crossing member 124 to the data line 171 through a contact hole 910 formed at the gate insulating layer (140 shown in FIG. 2) or the protective layer (180 shown in FIG. 2).

FIG. 12 illustrates a configuration that the second crossing member 710 shown in FIG. 11 is modified to become similar to the first crossing member 124 for obtaining uniform contact resistance at the data line cross-connection. As shown in FIG. 12, the second crossing member 710 connects the data line 171 to the third crossing member 720 connected to the data pad 179 through a contact hole 910 formed at the gate insulating layer (140 shown in FIG. 2) or the protective layer (180 shown in FIG. 2).

The data lines for transmitting image signals to the red and the green pixel columns including the data line cross-connections includes contact portions with the first, second or third crossing members so that they have line resistance different from other data lines. This is liable to exert a bad influence to the display characteristic of the LCD. In order to solve the problem, the difference in the line resistance of the data lines is required to be minimized. For this purpose, it is preferable to provide a connection at each data line. This will be now described with reference to FIG. 13.

Figure 13:
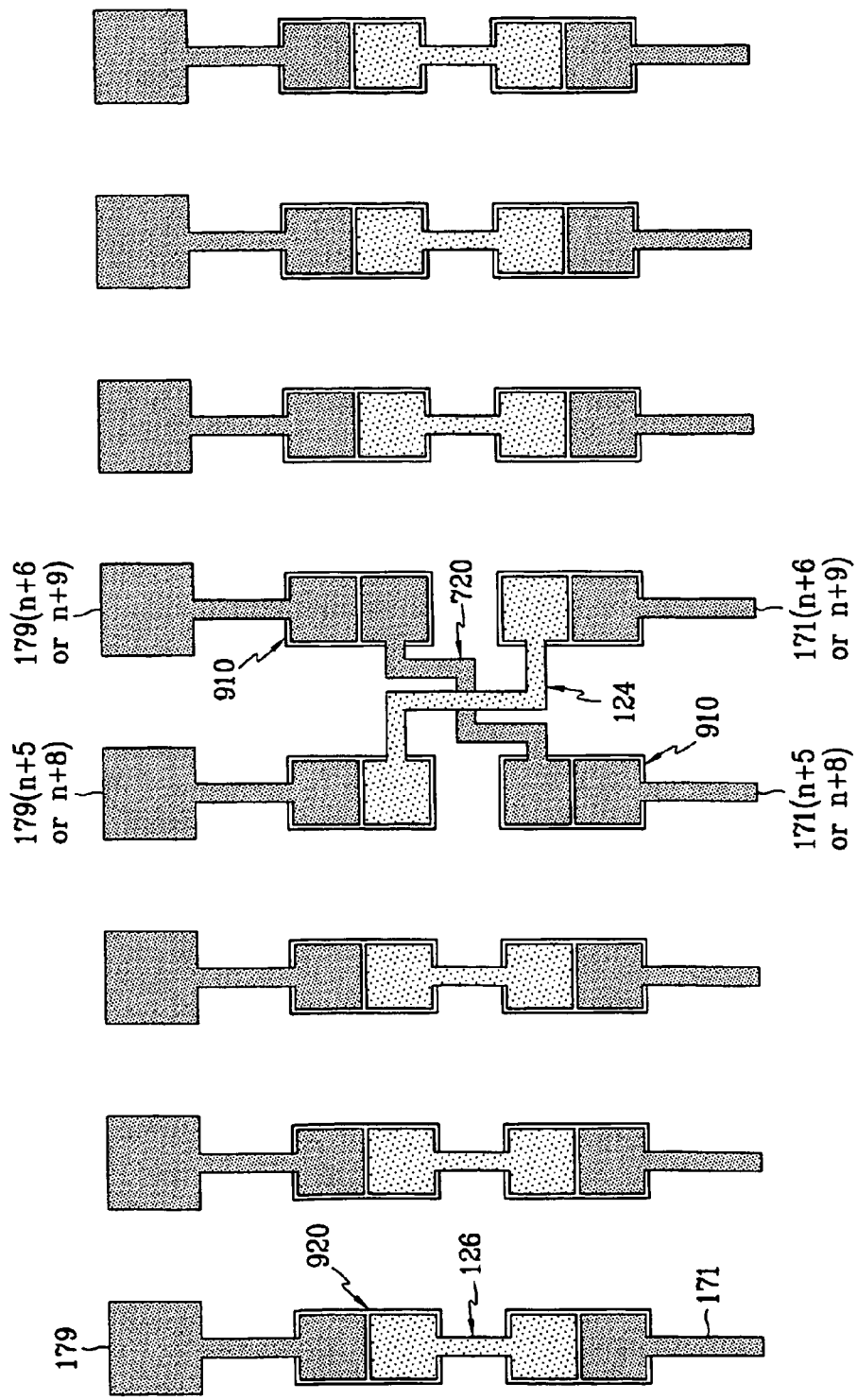
FIG. 13 is a layout view of connections and cross-connections of data lines on the TFT panel for the LCD according to the third to the fifth embodiments of the present invention.

FIG. 13 is a layout view of connections and cross-connections of data lines on the TFT panel for the LCD according to the third to the fifth embodiments of the present invention.

As shown in FIG. 13, each data line 171 is connected to a data pad 179 through a first connection wire 126 formed of the same layer as a gate wire, and the second connection wire 720 formed of the same layer as pixel electrodes.

In the above structure, each data line 171 is connected to the corresponding data pad through two contact portions so that the data lines 171 have uniform linear resistance to prevent the deterioration of the display characteristic.

Meanwhile, the LCD with the above-described PenTile Matrix pixel arrangement according to the embodiments of the present invention is subject to rendering for realizing high resolution. The rendering refers to a technique that individually drives red, green and blue pixels after distributing a luminance of a pixel to neighboring pixels for finely displaying an oblique line or a curved line and increasing the resolution.

However, a black matrix disposed between the pixels for preventing light leakage, which is displayed in black, causes phase error since the area occupied by the black matrix is not considered in rendering. In order to solve the problem, the width of the black matrix is required to be minimized to minimize the area occupied by the black matrix.

For this purpose, the size of the pixel electrode 190, 190R, 190G, 190B1 and 190B1 (referring to FIGS. 1 and 6) is required to be maximized such that edges of the pixel electrode overlap the gate lines 121 and the data lines 171. In the structure shown in FIG. 1, each gate line 121 includes only a single line and the gate line connection 127 is omitted, and a separate storage wire may be additionally introduced as shown in FIG. 2. However, when the pixel electrodes 190, 190R, 190G, 190B1 and 190B1 (as shown in FIGS. 1 and 6) overlap the data lines 171 with interposing a passivation layer 180, a parasitic capacitance generated therebetween may distort the data signal transmitted through the data line 171. In order to solve the problem, the protective layer 180 is preferably made of an acryl-based organic insulating material having a low dielectric constant and an excellent flattening characteristic, or a chemical vapor deposited insulating material having a low dielectric constant equal to or less than 4.0 such as SiOC or SiOF. Consequently, the size of the pixel electrode 190, 190R, 190G, 190B1 and 190B1 (as shown in FIGS. 1 and 6) can be maximized to secure a high aperture ratio and to minimize the width of the black matrix for preventing light leakage between the pixels. The minimized black matrix area increases the brightness and thus improves the color reproduction, thereby enabling precise rendering.

Meanwhile, the structures of the TFT array panel for the LCD according to the first to the fifth embodiments of the present invention suggest various kinds of wire configurations or wire connection configurations for interconnecting the pixel electrodes for blue pixels in the neighboring pixel rows, for connecting the data lines for the neighboring blue pixels to one pad, and for performing the inversion. A data pad is connected to each data line for simplifying the structure of the data wire or for facilitating inversion or rendering. This will be now described with reference to the figures.

Figure 14:
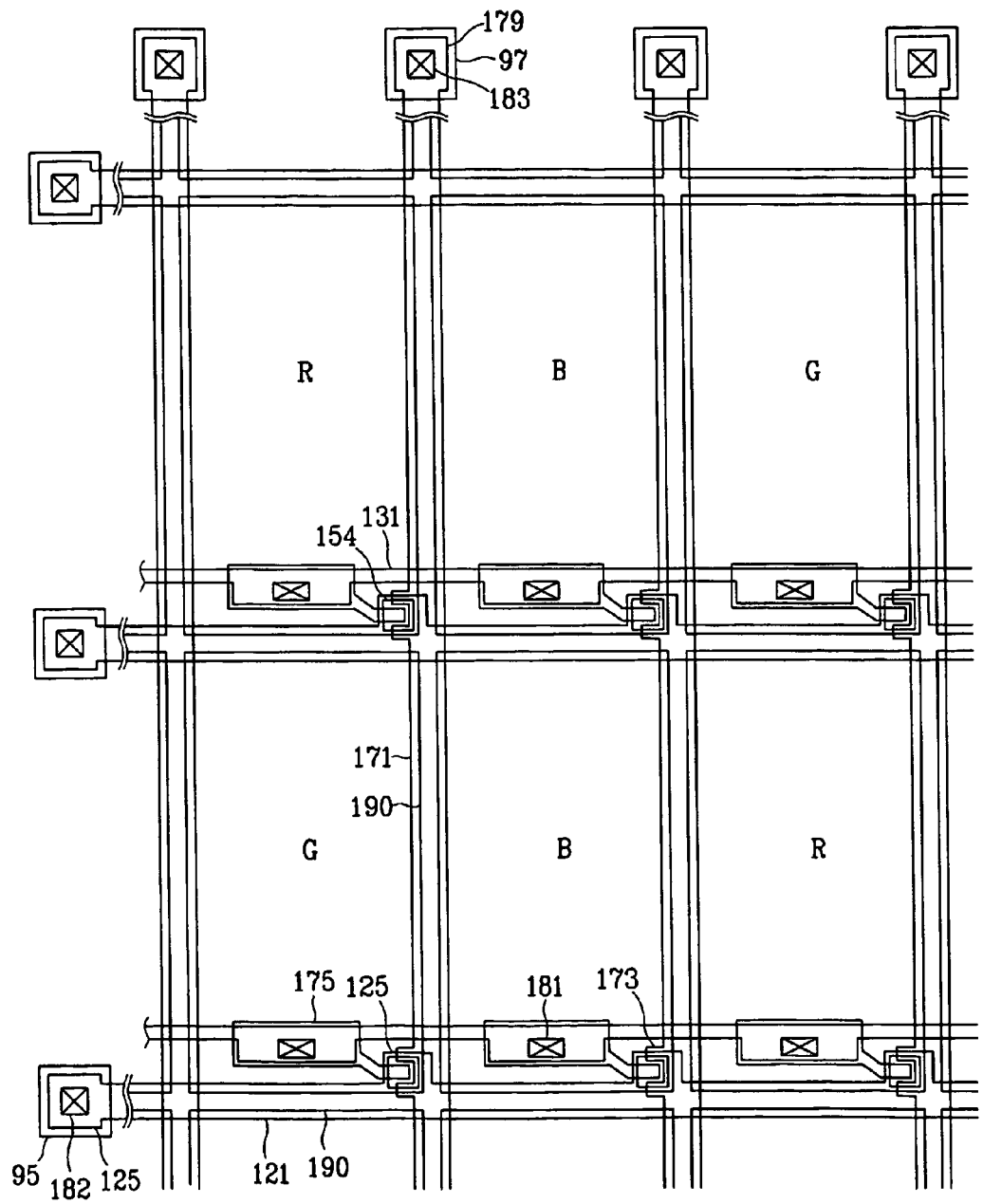
FIG. 14 is a layout view of an LCD with a PenTile Matrix pixel arrangement according to a sixth embodiment of the present invention.

FIG. 14 is a layout view of an LCD with a PenTile Matrix pixel arrangement according to a sixth embodiment of the present invention. The sectional structure or the pad structure is almost the same as those related to the first to the third embodiments of the present invention, and hence, the description thereof will be omitted while making a description for the pixel layout.

Referring to FIG. 14, an LCD with a PenTile Matrix pixel arrangement according to a sixth embodiment of the present invention includes red, blue and green pixels R, B and G arranged in a matrix. The red, blue and green pixels R, B and G are sequentially arranged in a row direction. One kind of pixel columns include the red and green pixels alternately arranged, and the other kind of pixel columns include only the blue pixels B. In a pixel row, the red and the green pixels R and G are standing at both sides of the blue pixel B.

As shown in FIG. 14, a plurality of gate lines (or scanning lines) 121 for carrying scanning signals or gate signals, which extend in the row direction, are provided at the respective pixel rows. A plurality of data lines 171 for carrying data signals are provided at the respective pixel columns. The data lines 171 proceed in the column direction such that they cross over the gate lines 121 to define pixel areas and are insulated from each other.

Each pixel area has a shape of rectangle having 2:3 horizontal to vertical ratio. The ratio is determined in consideration that two blue pixels form one dot in association with the pair of red and green pixels arranged at the left and the right sides thereof in an alternate manner.

Unlike the LCDs according to the first to the fifth embodiments of the present invention, the LCD according to the sixth embodiment of the present invention provides the pixel arrangement for the blue pixels, which is the same as that for the red and the green pixels. That is, a TFT is formed at each cross point of the gate lines 121 and the data lines 171. The TFT includes a gate electrode 123 connected to the gate line 121, a source electrode 173 connected to the data line 171, a drain electrode 175 facing the source electrode 173 with respect to the gate electrode 123, and a semiconductor layer 154. A plurality of pixel electrodes 190 are provided at respective blue pixels and electrically connected to the gate lines 121 and the data lines 171 through the TFTs.

Furthermore, unlike the structures related to the first and the second embodiments of the present invention, a plurality of storage electrode lines 131 formed of the same layer as the gate lines 121 are provided. The storage electrode lines 131 proceed in the transverse direction such that they overlap the pixel electrodes 190 to form storage capacitors. A plurality of contact holes 180 for connecting the pixel electrodes 190 to the data wire are formed at a protective layer 180 (as shown in FIGS. 1 and 2) on a plurality of drain electrodes 173. A data pad 179 is connected to an end of each data line 171, receives image signals from an external device, and transmits them to the data line 171.

This structure facilitates the inversion since the data lines 172 for transmitting the data signals to the blue pixels B easily receive the data signals through their own data pads 179. Therefore, the LCD does not have a complicated wire configuration such as connections and cross-connections of the data wire unlike the structures related to the fourth and the fifth embodiments of the present invention, thereby realizing uniform line resistance of the signal wire over the entire area of the panel. Furthermore, since the data lines 175 for the blue pixels B are connected to their own data pads 179 for receiving the image signals, the rendering is also easy. In addition, the LCD has the advantages of the first to the third embodiments of the present invention.

A PenTile Matrix LCD with improved viewing angle according to a seventh embodiment of the present invention will be now described in detail.

Figure 15:
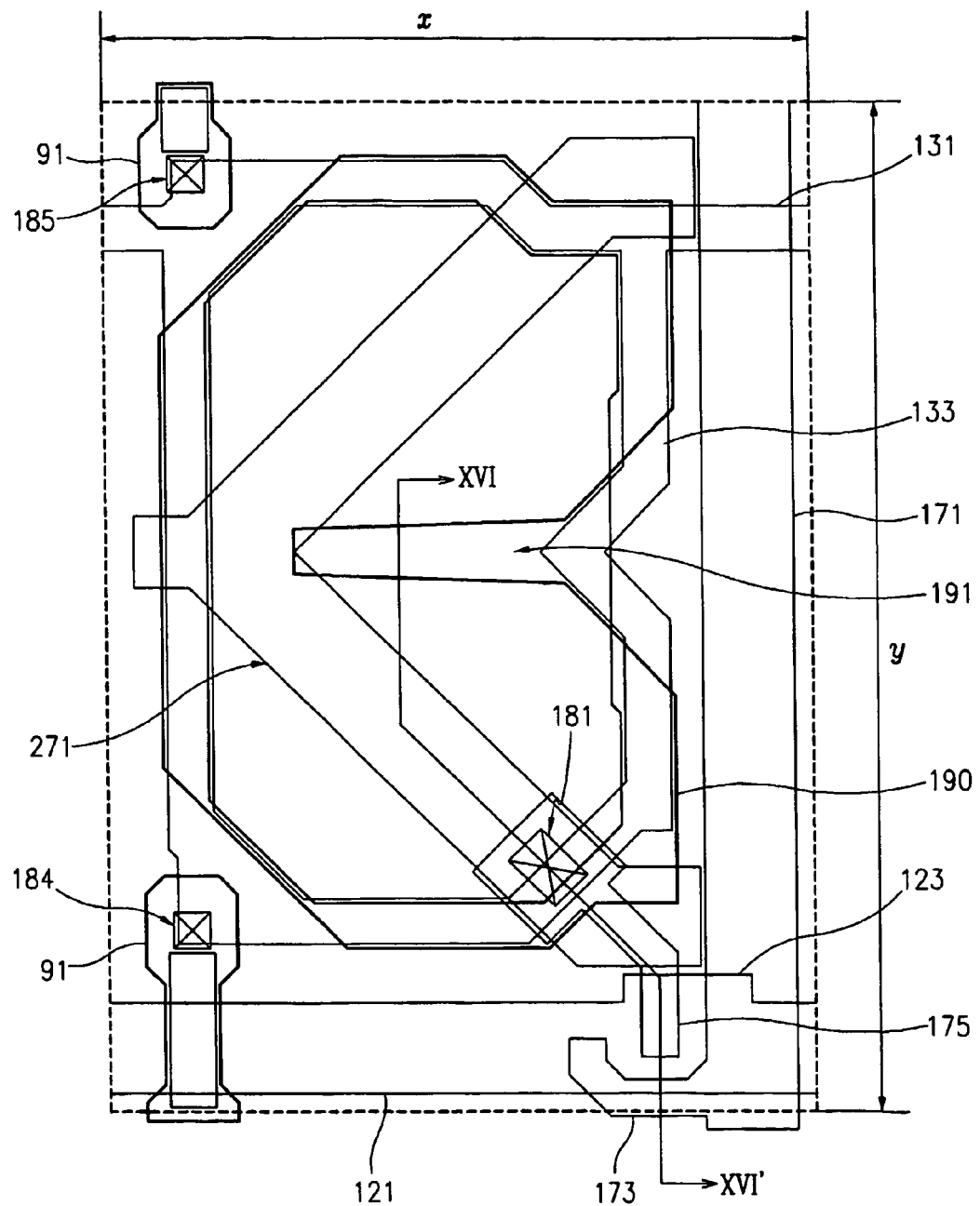
FIG. 15 is a layout view of an LCD according to a seventh embodiment of the present invention.
Figure 16:
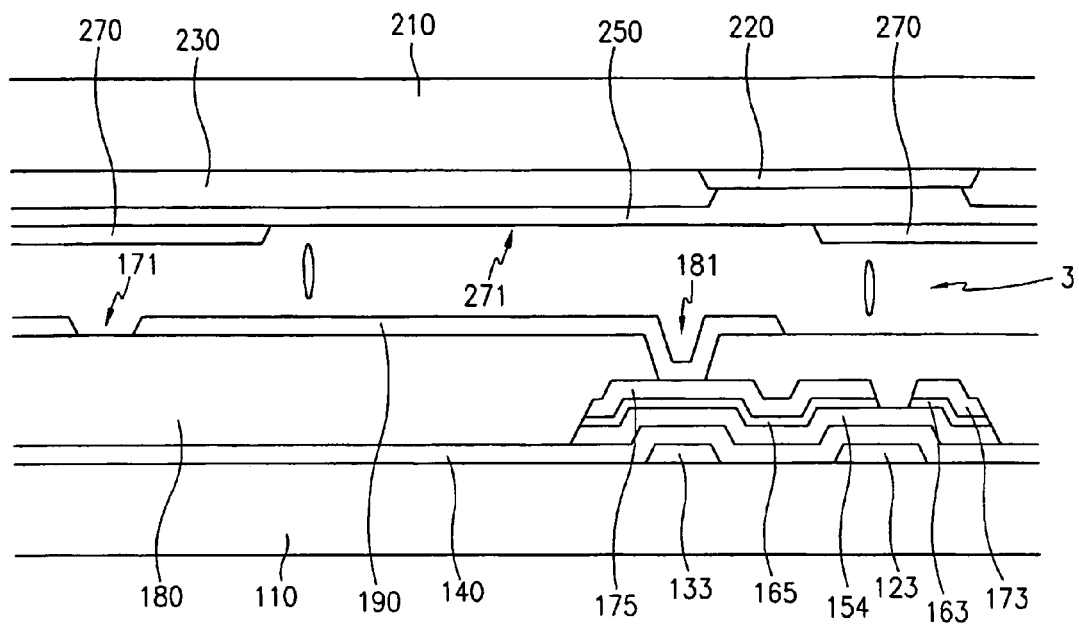
FIG. 16 is a sectional view of the LCD shown in FIG. 15 taken along the line XVI-XVI'.

FIG. 15 is a layout view of an LCD according to a seventh embodiment of the present invention, and FIG. 16 is a sectional view of the LCD shown in FIG. 15 taken along the line XVI-XVI'.

The LCD includes a TFT array panel, a color filter array panel, and a liquid crystal layer sandwiched between the panels.

The TFT array panel will be first described in detail.

As shown in FIGS. 15 and 16, a plurality of gate lines 121 are formed on an insulating substrate 110. The gate lines 121 proceed in a transverse direction, and a plurality of portions of each gate line 121 form a plurality of gate electrodes 123. A plurality of storage electrode lines 131 and storage electrodes 133 connected thereto are formed on the insulating substrate 110. The storage electrode lines 131 proceed substantially in the transverse direction but having some curves. The storage electrodes 133 connected to the storage electrode lines 131 have a shape of a closed loop.

A gate insulating layer 140 is formed on the gate wire 121 and 123 and the storage electrode wire 131 and 133.

An amorphous silicon layer 154, an ohmic contact layer 163 and 165, and a data wire 171, 173 and 175 are sequentially deposited on the gate insulating layer 140. The ohmic contact layer 163 and 165 is made of amorphous silicon heavily doped with N-type impurities. The data wire 171, 173 and 175 has substantially the same outline as the ohmic contact layer 163 and 165, and the amorphous silicon layer 154 has substantially the same outline as the data wire 171, 173 and 175 except for TFT channel portions. That is, the amorphous silicon layer 154 continuously proceeds across the channel portions, but the data wire 171, 173 and 175 and the ohmic contact layer 163 and 165 are separated around the channel portions. Therefore, the data wire is considered to have a triple-layered structure including the amorphous silicon layer 154, the ohmic contact layer 163 and 165, and the metal layer 171, 173 and 175.

The data wire 171, 173 and 175 includes a plurality of data lines 171, a plurality of source electrodes 173, and a plurality of drain electrodes 175. The source electrodes 173 are connected to the data lines 171, and the drain electrodes 175 faces the source electrodes 173 on the gate electrodes 121 with being spaced apart from each other by a predetermined distance.

A protective layer 180 having a plurality of contact holes 181, 184 and 185 is formed on the data wire 171, 173 and 175.

A plurality of pixel electrodes 190 are formed on the protective layer 180. Each pixel electrode 190 has a cutout 191 proceeding from the right edge of the pixel electrode 190 toward the left edge thereof and bisecting the pixel electrode 190 into upper and lower halves.

The color filter array panel will be now described in detail.

A black matrix 220 is formed on a transparent substrate 210, and red, green and blue color filters 230 are formed on the black matrix 220. An overcoat layer 250 is formed on the color filters 230, and a common electrode 270 having a plurality of cutouts 271 is formed on the overcoat layer 250. The cutout 271 of the common electrode 270 has a shape of a capital letter V. The cutout 271 further partitions the pixel area bisected by the cutout 191 of the pixel electrode 190 to form four quarters. The cutout 271 is curved at an angle of about 90°, and two branches thereof make an angle with the gate line 121 by about 45° or 135°.

The cutout 271 largely overlaps the drain electrode 175, at least at the contact hole area. That is, the TFT array panel is designed such that the drain electrode 175 overlaps the cutout 271 after the TiF array panel is assembled with the color filter array panel. The overlap scheme of the cutout 271 and the drain electrode 175 is to minimize the reduction of the aperture ratio.

A liquid crystal layer is sandwiched between the TFT array panel and the color filter array panel. The liquid crystal molecules contained in the liquid crystal layer are aligned perpendicular to the substrates 110 and 210 in absence of electric field between the pixel electrode 190 and the common electrode 270.

Each pixel area has a shape of a rectangle having the ratio of a horizontal length (x) to a vertical length (y) equal to 2:3. The ratio is determined in consideration that two blue pixels form one dot in association with the pair of red and green pixels arranged at the left and the right sides thereof in an alternate manner.

The cutout 271 of the common electrode 270 and the cutout 191 of the pixel electrode 190 partition a pixel region into four domains having uniform orientations of the liquid crystal molecules. The mutual compensation of the four domains gives a wide viewing angle.

In the above-described structure, the PenTile Matrix driving provides high resolution images, and at the same time, the control of the arrangement of the liquid crystal molecules by the cutouts of the pixel electrode and the common electrode provides wide viewing angle.

As described above, with the inventive PenTile Matrix pixel arrangement, the high resolution expression capacity being advantageous in displaying a letter or a device is exerted while minimizing the design cost. The data lines for transmitting signals to the blue unit pixels are linearly formed with the same shape as other signal wire components so that the display characteristic can be obtained in a uniform manner. Furthermore, the storage capacitance can be obtained using the previous gate lines while optimizing the parasitic capacitance due to the overlapping of the connections and their own gate lines. In this way, the storage capacitance can be obtained in a uniform manner. In addition, the data wire and the gate wire are spaced apart from each other with a predetermined distance while preventing the neighboring signal wire components from being short-circuited. The data driving ICs may be arranged at a one area with respect to the display area using the pad connections while optimizing the size of the display device. In this case, the repair lines may be easily formed at the periphery of the display area to repair the possible disconnection or the short-circuiting of the signal wire components.

Furthermore, the inversion with uniform polarities can be made through cross-applying the image signals to the red and the green pixel column neighbors between the two blue pixel columns electrically connected to each other. The neighboring blue pixel columns move by ½ pixel so that the uniform inversion can be made using the previous gate line or the relevant data line at all the blue pixels, while obtaining a uniform storage capacitance. The gate line, the data line and the pixel electrode overlap each other while interposing a low dielectric insulating material, thereby obtaining a maximum aperture ratio. In this way, the rendering driving technique is effectively applied to precisely express the image at high resolution. The image signals are applied to the data lines through the respective data pads, and hence, it is not required to make a complicated signal wire structure or a wire connection configuration. In this way, the rendering driving or the inversion can be made in an easy manner. Furthermore, the domain partitioning based on the cutouts makes it possible to obtain wide viewing angle.

What is claimed is:

1. A thin film transistor array panel comprising:
an insulating substrate;
a plurality of gate lines carrying scanning signals, formed on the insulating substrate, and proceeding in a transverse direction;
a plurality of data lines carrying image signals, proceeding in a longitudinal direction to intersect the gate lines, and insulated from the gate lines;
a plurality of pixel electrodes formed in respective pixels defined by intersections of the gate lines and the data lines and receiving the image signals; and
a plurality of thin film transistors formed in the pixels and having gate electrodes connected to the gate lines, source electrodes connected to the data lines, and drain electrodes connected to the pixel electrodes,
wherein a ratio of horizontal to vertical of each pixel is substantially equal to 2:3.

2. The thin film transistor array panel of claim 1, wherein the pixel electrodes overlap previous gate lines for transmitting the scanning signals to previous adjacent pixel rows to form storage capacitors.

3. The thin film transistor array panel of claim 1, further comprising a plurality of storage electrode lines separated from the gate lines, formed of the same layer as the gate lines, and overlapping the pixel electrodes to form storage capacitors.

4. The thin film transistor array panel of claim 1, further comprising a protective layer formed between the pixel electrodes and the gate lines and the data lines, made of acryl-based organic insulating material or chemical vapor deposited insulating material having a dielectric constant equal to or less than 4.0, and having a plurality of contact holes for electrically connecting the pixel electrodes to the drain electrodes.

5. The thin film transistor array panel of claim 1, wherein the data lines have a triple-layered structure including an amorphous silicon layer, an ohmic contact layer, and a metallic layer.

6. The thin film transistor array panel of claim 1, wherein the pixel electrodes have cutouts.

7. The thin film transistor array panel of claim 1, wherein a data pad for receiving data signals from an external device is connected to each data line.

8. A liquid crystal display comprising:
a first insulating substrate;
a plurality of gate lines carrying scanning signals, formed on the first insulating substrate, and proceeding in a transverse direction;
a plurality of data lines carrying image signals, proceeding in a longitudinal direction to intersect the gate lines, and insulated from the gate lines;
a plurality of pixel electrodes formed in respective pixels defined by intersections of the gate lines and the data lines and receiving the image signals; and
a plurality of thin film transistors formed in the pixels and having gate electrodes connected to the gate lines, source electrodes connected to the data lines, and drain electrodes connected to the pixel electrodes;
a second insulating substrate facing the first insulating substrate;
a black matrix formed on the second insulating substrate;
red, green and blue color filters formed on the black matrix and provided at the respective pixels;
a common electrode formed on the color filters; and
a liquid crystal layer sandwiched between the pixel electrode and the common electrode,
wherein red, blue and green pixels are sequentially arranged in a row direction, the red and the green pixels are alternately arranged in a column direction, the blue pixels are repeatedly arranged in the column direction, four red and green pixels surrounding adjacent two blue pixels in neighboring two pixel rows face each other, and a ratio of horizontal to vertical of each pixel is equal to 2:3.

9. The liquid crystal display of claim 8, wherein each pixel electrode has a first cutout, the common electrode has a plurality of second cutouts, and each pixel is partitioned into a plurality of domains by the first and the second cutouts.

10. The liquid crystal display of claim 9, wherein liquid crystal molecules contained in the liquid crystal layer are aligned perpendicular to the first and the second substrates in absence of electric field between the pixel electrodes and the common electrode.

11. The liquid crystal display of claim 9, further comprising a protective layer formed between the pixel electrodes and the gate lines and the data lines and having a plurality of contact holes for electrically connecting the pixel electrodes to the drain electrodes, the drain electrodes overlapping the second cutouts at least at the contact holes.

* * * * *